(12) United States Patent
Russo

(10) Patent No.: US 11,851,356 B2
(45) Date of Patent: Dec. 26, 2023

(54) BIOREACTOR SYSTEM AND METHOD FOR NITRIFICATION AND DENITRIFICATION

(71) Applicant: THE RESEARCH FOUNDATION FOR THE STATE UNIVERSITY OF NEW YORK, Albany, NY (US)

(72) Inventor: Frank M. Russo, Stony Brook, NY (US)

(73) Assignee: THE RESEARCH FOUNDATION FOR THE STATE UNIVERSITY OF NEW YORK, Albany, NY (US)

( * ) Notice: Subject to any disclaimer, the term of this patent is extended or adjusted under 35 U.S.C. 154(b) by 0 days.

(21) Appl. No.: 17/781,111

(22) PCT Filed: Jan. 5, 2021

(86) PCT No.: PCT/US2021/012145
§ 371 (c)(1),
(2) Date: May 31, 2022

(87) PCT Pub. No.: WO2021/141877
PCT Pub. Date: Jul. 15, 2021

(65) Prior Publication Data
US 2022/0411300 A1     Dec. 29, 2022

Related U.S. Application Data

(60) Provisional application No. 63/107,686, filed on Oct. 30, 2020, provisional application No. 62/957,555, filed on Jan. 6, 2020.

(51) Int. Cl.
C02F 3/30     (2023.01)
C02F 3/00     (2023.01)
C02F 103/00     (2006.01)

(52) U.S. Cl.
CPC .............. C02F 3/302 (2013.01); C02F 3/006 (2013.01); C02F 2103/005 (2013.01); C02F 2209/03 (2013.01); C02F 2301/046 (2013.01)

(58) Field of Classification Search
CPC ...... C02F 3/302; C02F 3/006; C02F 2209/40; C02F 2209/42; C02F 2301/046
(Continued)

(56) References Cited

U.S. PATENT DOCUMENTS 3,964,998 A     6/1976     Barnard
4,167,479 A     9/1979     Besik
(Continued)

FOREIGN PATENT DOCUMENTS

CN     1229403 A     9/1999
CN     101058462 A     10/2007
(Continued)

OTHER PUBLICATIONS

Canadian Examination Report dated Jul. 13, 2022 received in Canadian Application No. 3,163,327.
(Continued)

*Primary Examiner* — Claire A Norris
(74) *Attorney, Agent, or Firm* — Scully, Scott, Murphy & Presser, P.C.

(57) ABSTRACT

A method and system for the nitrification and denitrification of septic effluent, e.g. from a domestic septic tank, is disclosed comprising a variable speed pump system for constant continuous flow and a recycle mechanism to increase efficacy in producing a final denitrified effluent suitable for discharge to ground or surface waters.

27 Claims, 4 Drawing Sheets

(58) Field of Classification Search
USPC ............ 210/150, 903, 194, 195.1, 621, 614
See application file for complete search history.

(56) References Cited

U.S. PATENT DOCUMENTS

| | | | |
|---|---|---|---|
| 4,173,531 A * | 11/1979 | Matsch | C02F 3/1215 |
| | | | 210/906 |
| 4,183,810 A | 1/1980 | Baenens et al. | |
| 4,290,884 A | 9/1981 | Mandt | |
| 4,425,231 A | 1/1984 | Fujimoto et al. | |
| 5,192,441 A | 3/1993 | Sibony et al. | |
| 5,258,121 A | 11/1993 | Jordan et al. | |
| 5,288,407 A * | 2/1994 | Bodwell | C02F 3/2806 |
| | | | 210/903 |
| 5,352,357 A | 10/1994 | Perry | |
| 5,531,894 A | 7/1996 | Ball et al. | |
| 5,534,147 A | 7/1996 | Kallenbach et al. | |
| 6,447,682 B1 | 9/2002 | Flowers | |
| 7,128,839 B1 | 10/2006 | Flowers et al. | |
| 7,749,384 B2 | 7/2010 | Patton et al. | |
| 9,272,931 B2 | 3/2016 | Robertson et al. | |
| 9,764,973 B2 | 9/2017 | Larsen et al. | |
| 2001/0027948 A1 | 10/2001 | Tipton et al. | |
| 2002/0070163 A1 | 6/2002 | Lambert | |
| 2003/0183572 A1 | 10/2003 | Penzes et al. | |
| 2007/0289922 A1 | 12/2007 | Ladron de Guevara et al. | |
| 2008/0283469 A1 | 11/2008 | Pollock | |
| 2009/0071900 A1 | 3/2009 | Kulick, III et al. | |
| 2010/0219125 A1 | 9/2010 | Northrop et al. | |
| 2011/0168616 A1 | 7/2011 | Robertson et al. | |
| 2012/0091045 A1 | 4/2012 | Robertson et al. | |
| 2013/0153494 A1 | 6/2013 | Wang et al. | |
| 2014/0158614 A1 | 6/2014 | Wang | |

FOREIGN PATENT DOCUMENTS

| | | |
|---|---|---|
| CN | 103936150 A | 7/2014 |
| CN | 109354320 A | 2/2019 |
| DE | 2616212 A1 | 10/1976 |
| DE | 2715256 A1 | 10/1977 |
| EP | 1993957 A2 | 11/2008 |
| JP | 2004528163 A | 9/2004 |
| JP | 2004530530 A | 10/2004 |
| KR | 20030041220 A | 5/2003 |
| KR | 20040026324 A | 3/2004 |
| KR | 20190001090 A | 1/2019 |
| WO | 1997033835 A2 | 9/1997 |
| WO | 2005100264 A2 | 10/2005 |
| WO | 2006039786 A1 | 4/2006 |
| WO | 2007103153 A2 | 9/2007 |
| WO | 2011088105 A1 | 7/2011 |
| WO | 2014143604 A1 | 9/2014 |
| WO | 2019107948 A2 | 6/2019 |
| WO | 2021/141877 A1 | 7/2021 |

OTHER PUBLICATIONS

International Search Report dated Mar. 25, 2021 issued in PCT/US2021/012145.

Moorman, T. B., et al., "Denitrification activity, wood loss, and N2O emissions over 9 years from a wood chip bioreactor", Ecological Engineering 36 (2010) pp. 1567-1574.

Lopez-Ponnada, E. V., et al., "Application of denitrifying wood chip bioreactors for management of residential non-point sources of nitrogen", Journal of Biological Engineering (2017), 14 pages, 11:16.

Oakley, S. M. et al., "Nitrogen control through decentralized wastewater treatment: Process performance and alternative management strategies", Ecological Engineering 36 (2010) pp. 1520-1531.

Van Driel, P.W., et al., "Denitrication of Agricultural Drainage using Wood-Based Reactors", American Society of Agricultural and Biological Engineers, 2006, pp. 565-573, 49(2).

Schipper, L. A., et al., "Denitrifying bioreactors—An approach for reducing nitrate loads to receiving waters", Ecological Engineering, Apr. 2010, pp. 1532-1543, 36.

Saliling, W. J. B., et al., "Wood chips and wheat straw as alternative biofilter media for denitrification reactors treating aquaculture and other wastewaters with high nitrate concentrations", Aquacultural Engineering 37, Jun. 2007, pp. 222-233.

Park, J. B. K., et al., "Removal of nitrate and phosphorus from hydroponic wastewater using a hybrid denitrification filter (HDF)", Bioresource Technology 100, Mar. 2009, pp. 3175-3179.

Yamashita, T., et al., "Nitrogen and Phosphorus Removal from Wastewater Treatment Plant Effluent via Bacterial Sulfate Reduction in an Anoxic Bioreactor Packed with Wood and Iron", Int. J. Environ. Res. Public Health Sep. 2014, 19 pages, 11.

* cited by examiner

BIOREACTOR SYSTEM AND METHOD FOR NITRIFICATION AND DENITRIFICATION

This application claims priority under 35 U.S.C. § 119 to U.S. Provisional Patent Applications U.S. Ser. No. 62/957,555, filed Jan. 6, 2020, and U.S. Ser. No. 63/107,686, filed Oct. 30, 2020, the entire contents of each of which are incorporated herein by reference.

FIELD

The disclosure pertains to a method of nitrification and denitrification of septic effluent, including without limitation, septic tank effluent from domestic residential installations, and a system for such nitrification and denitrification.

BACKGROUND

Heretofore, onsite wastewater treatment systems typically employed a septic tank to collect and partially decompose solids in the wastewater effluent from the septic tank. One known design is the Septic Tank Soil Adsorption System (SAS) wherein septic tank effluent (STE) is sent to a soil treatment unit, for example, a leachfield-drainfield system, to provide secondary treatment for the STE. Such systems, however, offer poor nitrogen removal resulting in a final effluent having undesirable levels of total nitrogen, e.g., 30 mg/L or more of total nitrogen. It has been estimated in this regard that nearly one-third of soil in North America may not meet modern drain field requirements.

Another known design which more regularly meets low effluent nitrogen concentration, i.e. 10 mg/L or less, is the Nitrogen Removing Biofilter (NRB). A typical NRB employs a septic tank the STE from which is pumped to a treatment system comprising a nitrification sand layer to which oxygen is provided by natural aeration and in which nitrification, the conversion of ammonia nitrogen to nitrate nitrogen, occurs. The nitrified effluent from the nitrification layer is gravity discharged to an underlying denitrification sand-lignocellulose layer in which carbon removed in the nitrification layer is provided back to serve as media for the bacteria necessary to perform the denitrification process to convert nitrate nitrogen to nitrogen gas. While the NRB design can achieve desired low effluent nitrogen concentration, it requires a large ground footprint and has a high cost of implementation. Moreover, operationally, the performance of both the NRB design and the SAS design are detrimentally subject to wide variations in daily STE flow; for example, such non-constant pulsed dosing of hydraulic and organic supply from the STE to downstream biological treatment units of the SAS and NRB designs results in inefficient bacterial conversion of ammonia nitrogen to nitrogen gas.

Thus there is a need for a nitrification and denitrification method and process/system that achieves high levels of nitrogen removal, can meet low effluent nitrogen concentration requirements, provides for low levels of organic material (measured as biochemical oxygen demand, BOD), has a small footprint, and is economically efficient to implement and maintain.

SUMMARY

The present disclosure satisfies the foregoing desiderata. In one aspect, the disclosure is directed to a method for nitrification and denitrification of septic effluent, including without limitation, onsite domestic septic tank effluent. The method comprises contacting the septic effluent with oxygen in a pump chamber to generate a pump chamber effluent having a dissolved oxygen concentration. The pump chamber effluent is passed to a nitrification zone to generate a first partly nitrated effluent and second partly nitrated effluent. The first partly nitrated effluent is passed to an anoxic zone to generate a partly nitrated anoxic effluent which has a dissolved oxygen concentration less than the dissolved oxygen concentration of the pump chamber effluent. This partly nitrated anoxic effluent is then passed to a first denitrification zone wherein at least a portion of the nitrates in the partly nitrated anoxic effluent is converted to nitrogen gas and where effluent from this first denitrification zone is recycled back to the pump chamber so that it be re-aerated and can again pass through the nitrification zone to increase levels of nitrate formation. The second partly nitrated effluent generated by the nitrification zone is passed to a second denitrification zone where denitrification zone effluent having low levels of total nitrogen is generated, which effluent can then be discharged to groundwater. In a non-limiting practice, the oxygen with which the septic effluent is contacted within the pump chamber is provided at least in part by an air pump system that can include a submerged aeration header which increases the dissolved oxygen concentration in the septic effluent to facilitate downstream conversion of ammonia to nitrate nitrogen. In another non-limiting practice, flow equalization throughout a given time period, e.g. a 24 hour day, is achieved by a variable speed pump system that provides a constant hydraulic and organic supply to, e.g., the nitrification zone.

In another aspect, the disclosure is directed to a system for nitrification and denitrification of septic effluent. The system comprises (i) a pump chamber for contacting septic effluent with oxygen, the pump chamber comprising an air pump system for providing at least a portion of the oxygen to be contacted with the septic effluent, and a variable speed pump system to discharge pump chamber effluent, the pump chamber effluent having a dissolved oxygen concentration, from the pump chamber; (ii) a nitrification zone in fluid communication with the pump chamber effluent that is discharged by the variable speed pump system, the nitrification zone comprising a nitrification bed that has a top surface and a bottom surface, from which nitrification bed is discharged a first partly nitrated effluent and a second partly nitrated effluent; (iii) an anoxic zone in fluid communication with the first partly nitrated effluent, which in one practice is discharged from the bottom surface of the nitrification bed, from which anoxic zone is discharged a partly nitrated anoxic effluent; (iv) a first denitrification zone in fluid communication with the first partly nitrated anoxic effluent, the first denitrification zone comprising a first denitrification bed wherein effluent from the first denitrification bed is recycled to the pump chamber; and (v) a second denitrification zone comprising a second denitrification bed that is in fluid communication with the second partly nitrated effluent discharged by the nitrification zone, the second denitrification bed discharging a second denitrification zone effluent that has low total nitrogen concentration, including without limitation, total nitrogen of 10 mg/L or less.

DETAILED DESCRIPTION

The ensuing detailed description of certain embodiments of the disclosure is made with reference to the accompanying drawings and is not limited to the scope of the disclosure. Explanation about related functions or constructions known in the art are omitted for the sake of clearness in understanding the concept of the invention to avoid obscuring the invention with unnecessary detail.

Figure 1:
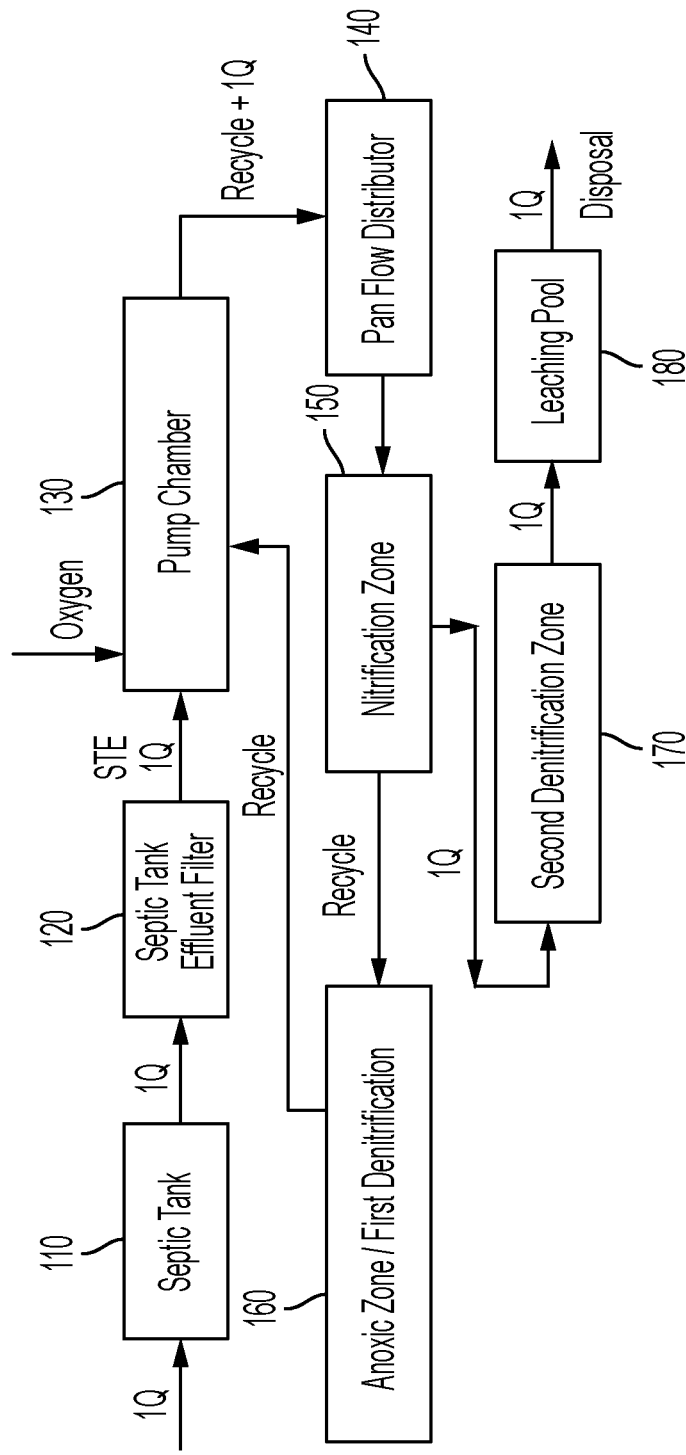
FIG. 1 is a process flow chart for an embodiment of the nitrification and denitrification method of the disclosure.

At FIG. 1 is a schematic process flow chart of an embodiment of the disclosure. In this embodiment, septic waste water from a domestic residence or other source flows, e.g. by gravity, to septic tank 110 wherein heavier material (sludge) settles to the bottom and the septic effluent from tank 110 flows to septic tank effluent filter 120 which removes miscellaneous floating debris. The septic effluent from filter 120 (STE) flows to pump chamber 130. Pump chamber 130 serves several purposes: (1) it provides septic effluent storage for pumping to downstream process units and also blends recycle flow from the anoxic zone/first denitrification zone 160 with raw septic effluent flow rates that can be predetermined, e.g. at a ratio of about 4 parts recycle plus 1 part average daily flow, denoted as 4 Q to 1 Q, where Q is the total daily sewage flow in liters, (2) it contacts oxygen with the septic effluent, e.g. with an air pump system, which increases the dissolved oxygen content of the septic effluent and in turn facilitates the downstream conversion of ammonia in the septic effluent to nitrate nitrogen, and (3) it provides flow equalization which minimizes the diurnal fluctuations in flow and wastewater strength thereby providing a constant continuous hydraulic and organic supply to the downstream biological processing units, which constant supply is preferred by bacteria for efficient conversion of ammonia nitrogen to nitrate nitrogen. Such flow equalization can be delivered by a variable speed pump system.

In the practice shown in FIG. 1, the pump chamber effluent (recycle+1Q) from pump chamber 140 flows to pan flow distributor 130 which is designed to provide a constant, even flow across the nitrification media in nitrification zone 150, e.g. the pan flow distributor can extend over the top of the nitrification media in nitrification zone 150 and can comprise a plurality of equally sized holes which are equally spaced. Two effluents emanate from nitrification chamber 150: one which is intended for recycle back to pump chamber 130 through the denitrification media (e.g. lignocelluse) 160; this effluent from nitrification zone 150 (recycle) effluent flows to the first denitrification zone/anoxic zone 160 from which anoxic zone the recycle stream aforesaid is returned to pump chamber 130 for re-aeration and mixing with raw septic tank effluent thus introducing an additional carbon source found in STE. The other effluent stream from nitrification zone 150 flows (at 1Q) to a second denitrification zone 170 from which a final denitrification zone effluent is discharged to leaching pool 180, the final denitrification zone effluent comprising total nitrogen levels suitable for ecologically desired discharge, e.g., total nitrogen levels of 10 mg/L or less.

Figure 2:
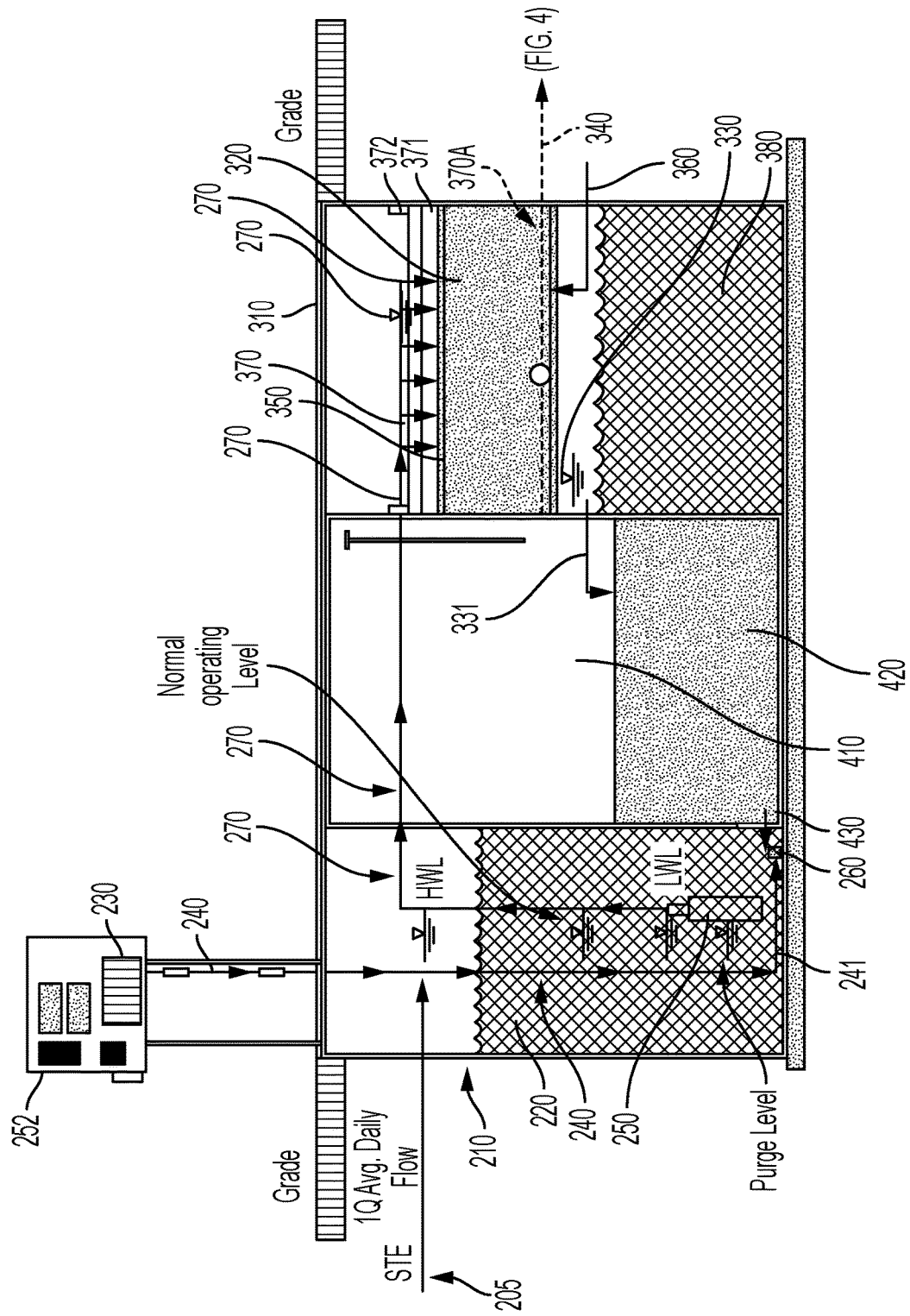
FIG. 2 is a cross sectional view of an embodiment of the system for and method of nitrification and denitrification of the disclosure up to the second denitrification zone.
Figure 3:
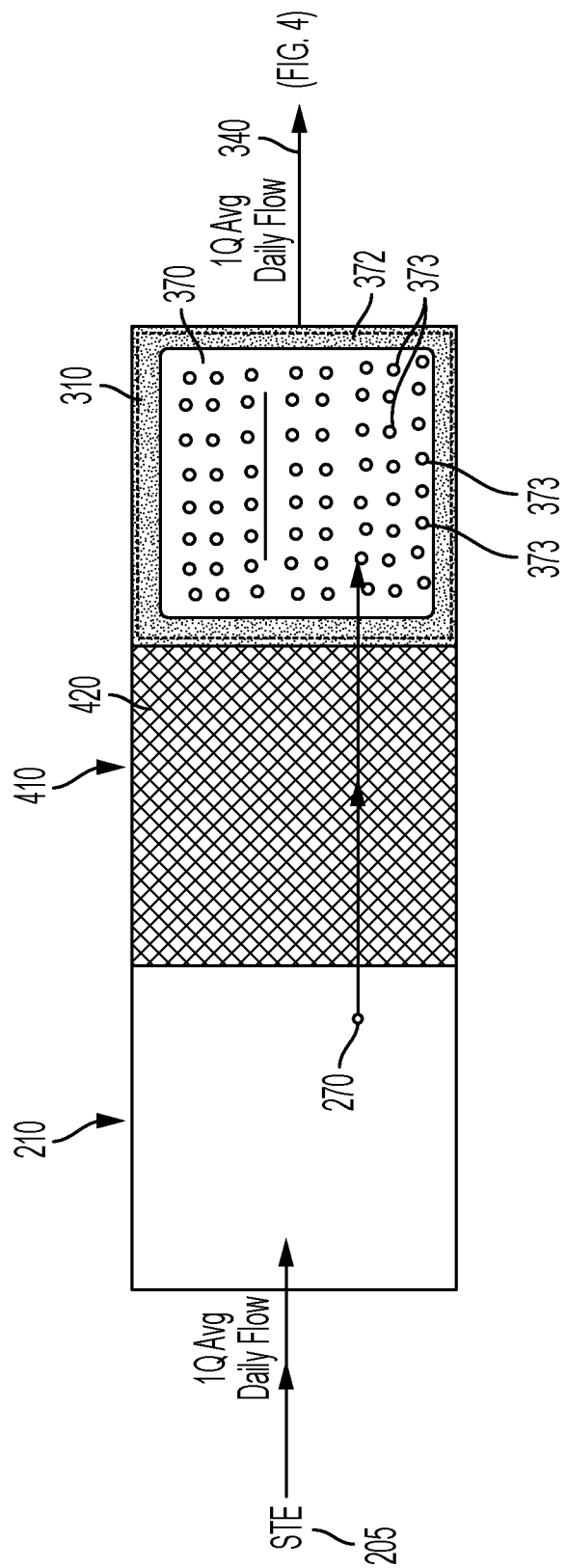
FIG. 3 is a top view of the system and method of FIG. 2.
Figure 4:
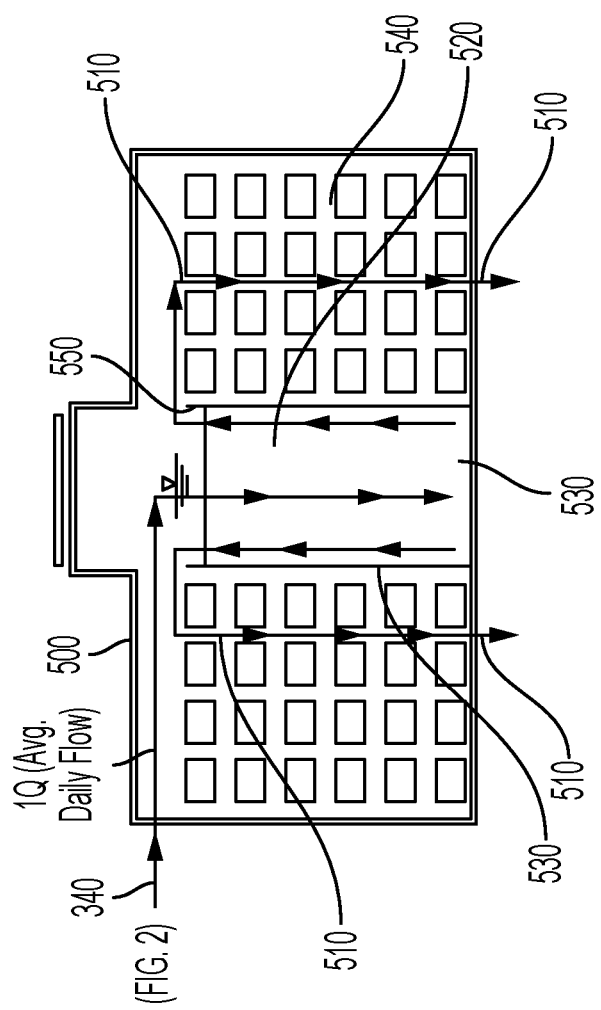
FIG. 4 is a cross-sectional view of an embodiment of the second denitrification zone of the disclosure.

FIGS. 2, 3, and 4 depict a non-limiting embodiment of a method and system for nitrification and denitrification of septic effluent of the disclosure. Pump chamber 210 comprises septic effluent 220 (shown by cross hatching) derived from a septic tank feed 205 which can be gravity conveyed or pumped from a residential or other septic waste source; the septic feed 205 may be filtered to remove floating debris prior to entering the pump chamber. The septic tank feed 205 can fluctuate widely over a period of time, e.g. 24 hours, and is shown with an average daily flow of 1 Q. In pump chamber 210 the septic effluent 220 therein is contacted with oxygen 240 to increase dissolved oxygen content in the resulting pump chamber effluent stream 270. In one practice, the pump chamber effluent 270 has a dissolved oxygen concentration ranging from 2 mg/L to 6 mg/L. In the embodiment shown, at least a portion of the oxygen to be contacted with the septic effluent 220 with an air pump system 230 at control panel 252 optionally comprising an aeration header 241 that is submerged at least in part in septic effluent. The air pump system and aeration header can be of conventional design and multiple air pumps and aeration headers and configurations of aeration headers can be used. In another practice, oxygen can be added to the pump chamber by cascade aeration. Aeration cascade can be used with the air pump system. In another practice, oxygen can be added to the pump chamber via a venturi, which can be used with the air pump system.

Pump chamber 210 also comprises a variable speed pump system 250 which is operable to achieve constant and continuous flow of pump chamber effluent 270 to serve as feed to downstream nitrification zone 310. In the practice shown, variable speed pump system 250 is configured to be submerged in at least a portion of the septic effluent, including fully submerged as depicted. Variable speed pump system 250, which can comprise a variable frequency drive (VFD) progressive cavity submersible type pump, can be controlled by a pressure transducer 260 located, e.g. at or near the bottom of the pump chamber 210 and which automatically adjusts the speed of the pump in response to variations of the septic effluent between the high septic effluent level (shown as HWL) and the low septic effluent level (shown as LWL) thereby maintaining the constant continuous flow of pump chamber effluent 270 to the nitrification zone 320. The use of a variable speed pump system, such as a variable frequency drive (VFD) controlled progressive cavity pump produces a set volume of flow per minute of operation based on the speed of the pump motor. This provides means to control the forward flow of the septic effluent 220 based on the diurnal and seasonal hydraulic/organic needs of the system. In one practice, a total flow of 5 times the average daily flow (5Q) is constant to the nitrification zone 310 throughout the day (at a rate adjustable by the system operator to enhance system performance).

Pump chamber effluent 270, having an increased dissolved oxygen concentration due to the contact with oxygen in the pump chamber 210, is passed to a nitrification zone 310, which is in fluid communication with pump chamber effluent 270, to generate a first partly nitrified effluent 330 and second partly nitrified effluent 340. In one practice, the nitrification zone comprises nitrification media in the form of a nitrification bed 320 comprising a top nitrification bed surface 350 and a bottom nitrification bed surface 360. As used herein throughout, the term "bed" includes conventional fixed bed designs and biofilter designs, e.g. wherein the media is packed in the nitrification chamber. The nitration media can comprise substances known in the art for this purpose, including without limitation sand, gravel, peat, biochar, synthetic media, or combinations thereof. Synthetic media can comprise, without limitation, polymeric materials as known in the art, including synthetic media that comprises oxygen-containing internal portions, such as atmospheric oxygen contained in interstices or on internal surfaces, e.g. spherical media having holes therethrough, through which the pump chamber effluent passes to increase the dissolved oxygen content of the pump chamber effluent as it passes through the nitrification bed. In one practice, the synthetic media in the nitrification bed has a high void space, e.g. 90% to 95%, which provides for a higher concentration of bacteria per cubic foot of synthetic media than conventional sand media. This higher surface area also allows for a higher surface loading rate, which in turn decreases the footprint and cost of the nitrification zone and overall system.

In the embodiment shown, the nitrification zone 310 (wherein conversion of ammonia nitrogen to nitrate nitrogen occurs) comprises a pan flow distributor system 370 disposed above the top surface 350 of the nitrification bed 320. The pan flow distributor system 370 is configured to disperse the pump chamber effluent 270 equally across the top surface 350 of the nitrification bed. The equal flow across the top surface of the bed minimizes short-circuiting thereby enabling full use of all the nitrification media, which in turn results in a reduced footprint and cost for the nitrification bed and the size of the overall system. In one practice, the pan flow distributor system 370 is spaced from the top surface of the nitrification bed 350 to create an air gap 371, which air gap 371 comprises atmospheric oxygen which is added to the pump chamber effluent as it drips down through the air gap 371 thus causing an increase in the dissolved oxygen concentration of the pump zone effluent 270 before it enters the nitrification bed 320. Without limitation, the pan flow distributor system 370 can comprise a flat pan (as depicted) comprising a plurality of holes 373 across the surface thereof, e.g. a plurality of equally sized holes, e.g. ⅛ inch in diameter, that are equally spaced, and an upwardly extending peripheral lip 372 that extends around the flat pan which defines an internal volume over the flat pan within which internal volume at least a portion of the pump chamber effluent 270 can collect, to further equalize flow across the top surface 350 of nitrification bed 320, before the pump chamber effluent 270 it enters the nitrification bed via the plurality of holes. In one practice, the flat pan is removable from grade level so that the nitrification media can be replaced if needed. The flat pan can also be hinged so that the pan, which can be divided into hinged halves, can be raised for maintaining the nitrification media.

As indicated in the FIG. 2, the flow of the pump chamber effluent 270 is downward through the nitrification bed, although other flow regimes are contemplated using pumps and the like. In one practice, the nitrification zone is maintained in an oxygen rich environment given dissolved oxygen in the pump chamber effluent 270, the air gap 371, and the internals of the synthetic media. Additional oxygen can be added by, e.g. ventilation pipes (not shown) which can be used to allow air to enrich the lower levels of the nitrification bed with atmospheric oxygen. These ventilation pipes can be capped if oxygen reaches a point that would inhibit the downstream intermediate denitrification biofilter, which operates in an anoxic condition. Thus, dissolved oxygen carry over can be controlled to downstream anoxic and/or denitrification zones.

The first partly nitrated effluent 330 is passed to an anoxic zone 380, e.g. by gravity or other means. The term "partly nitrated" as used throughout herein includes nitrification to any degree including full nitrification. The anoxic zone can comprise a compartment beneath or following the nitrification zone and generates a partly nitrated anoxic effluent having a dissolved oxygen concentration less than the dissolved oxygen concentration of the pump chamber effluent, e.g. in one practice the partly nitrated anoxic effluent comprises 2 mg/L or less of dissolved oxygen, which levels include approximately zero dissolved oxygen, i.e. it is substantially free of measureable oxygen. In one practice, the anoxic compartment contains a level of partly nitrated anoxic effluent 331 which is passed to a first denitrification zone 410, e.g. by overflow of the anoxic compartment or by other means, e.g. a pump, where a portion of the nitrates in the partly nitrated anoxic effluent 331 is converted to nitrogen gas. In one practice, the first denitrification zone 410 comprises a first denitrification bed 420, which can comprise a carbon-containing material as known in the art for denitrification, e.g. a carbon-containing material comprising wood chips, sawdust, lignocellulose, biochar, or other suitable organic or inorganic carbon, or any combinations thereof. The carbon-containing material, such as lignocellulose, provides carbon to sustain the denitrification process inasmuch as carbon was removed in the nitrification step, and also provides media for specific bacteria for denitrification to thrive.

Effluent 430 from the first denitrification zone 410, shown as effluent from denitrification bed 420 in FIG. 2, is recycled to the pump chamber 210. The recycling of effluent 430 from the first denitrification zone 410 to the pump chamber 210 can occur, without limitation, when the septic effluent in the pump chamber is at the low septic effluent level (LWL). In one practice, the effluent 430 can be conveyed to pump chamber 210 by automatically lowering the septic level in the pump chamber, e.g. one or more times per day, thus causing the recycle. The first denitrification bed 420 comprising e.g. lignocelluloses, is kept in a submerged state, to prolong the life of the lignocelluloses or other carbon-containing material, in the first denitrification zone 410. This can be accomplished by controlling the low septic effluent level (LWL) in the pump chamber 210 inasmuch as the first denitrification zone 410 is ultimately hydraulically connected to the pump chamber 210. In one practice, the partly nitrated anoxic effluent 331 is passed to the first denitrification zone 410 at a rate of up to and including 4Q. The flow of partly nitrated anoxic effluent 331 is passed to the first denitrification zone 410 to flow uniformly and downwardly into the first denitrification bed 420, e.g. the flow can, but need not, be a plug flow regime, to provide required hydraulic detention time in the denitrification bed 420.

In another embodiment (not shown), the anoxic zone is absent. In this instance, first partly nitrified effluent 330 is collected via an underdrain channel and conveyed by gravity directly to the first denitrification zone 410 at a rate of up to 4 Q. The flow first partly nitrified effluent 330 to the first denitrification zone 410 can be via a weir formed by the sharp and chamfered edge of the chamber forming the first denitrification zone 410 through a bottom window within the wall of the chamber. The plug flow to the first denitrification bed 420 is uniform and immediately downward providing the required hydraulic detention time therein. Again, the first denitrification bed 420 comprising e.g. lignocellulose, can be kept in a submerged state, to prolong the life of the lignocelluloses or other carbon-containing material, in the first denitrification zone 410; this can be accomplished by controlling the low septic effluent level (LWL) in the pump chamber 210 the first denitrification zone 410 is ultimately hydraulically connected to the pump chamber 210.

The second partly nitrated effluent 340 from first nitrification zone 310 is passed to a second denitrification zone 500 (FIG. 4), also denoted as a nitrate polishing zone, which removes nitrate nitrogen (by converting it to nitrogen gas) that may have escaped conversion via the recycle and the first denitrification zone and generates a denitrification zone effluent 510 which is suitable for discharge into ground or surface water, e.g. in various practices the denitrified effluent 510 can comprise: up to 19 mg/L of total nitrogen; or between 10 mg/L to 19 mg/L of total nitrogen; or 10 mg/L or less of total nitrogen. In one practice, the second partly nitrated effluent 340 can be collected from the bottom of nitrification bed 320 via a perforated pipe manifold 370A and passed by gravity or other means to the second denitrification zone 500 at a rate of 1Q, e.g. the rate of flow of the second partly nitrated effluent 340 from first nitrification zone 310 to the denitrification zone 500 can be controlled via an in-pipe flow control weir as known in the art, which is inserted inside the gravity flow pipe that limits the forward final flow to 1 time the average daily flow (1Q). In another practice, flow control throttling valves are used to proportion flow to downstream processes. In one practice, the second denitrification zone 500 comprises a second denitrification bed 520 which can comprise denitrification media as known in art and which can be the same or different from the denitrification media used in the first denitrification zone, e.g. a carbon-containing material comprising, without limitation, wood chips, sawdust, biochar, lignocellulose, or combinations thereof. In one practice, the denitrification bed a denitrification insert pipe 530 within which is the lignocelluose or other denitrification media, which pipe is inside a precast concrete leaching pool 540 from which is discharged denitrification zone effluent 510. In one practice, as depicted, the flow of second partly nitrated effluent 340 is discharged at or near the bottom of the second denitrification bed 520 and then upward through the second denitrification bed 520, e.g. lignocellulose, and then over weir 550 formed by the wall of the pipe 530. This configuration maintains a submerged condition of the second denitrification bed 520 to prolong the life of same.

The system of the disclosure can be comprised of individual vessels or can comprise a single vessel compartmentalized as shown in FIGS. 2 and 3. As depicted, all vessels are below grade but can be configured otherwise.

While the disclosure has been shown and described with reference to certain embodiments, it will be understood by those skilled in the art that various changes in form and details may be made therein without departing from the spirit and scope of the present invention and equivalents thereof.

What is claimed is:

1. A method for nitrification and denitrification of septic effluent comprising:
   contacting a septic effluent with oxygen in a pump chamber to generate a pump chamber effluent, the pump chamber effluent having a dissolved oxygen concentration;
   passing the pump chamber effluent to a nitrification zone to generate a first partly nitrated effluent and second partly nitrated effluent;
   passing the first partly nitrated effluent to an anoxic zone to generate a partly nitrated anoxic effluent, the anoxic effluent having a dissolved oxygen concentration less than the dissolved oxygen concentration of the pump chamber effluent;
   passing the partly nitrated anoxic effluent to a first denitrification zone wherein a portion of the nitrates in the partly nitrated anoxic effluent is converted to nitrogen gas and recycling effluent from the first denitrification zone to the pump chamber; and
   passing the second partly nitrated effluent to a second denitrification zone to generate a denitrification zone effluent.

2. The method of claim 1 wherein at least a portion of the oxygen with which the septic effluent is contacted is provided to the pump chamber by an air pump system.

3. The method of claim 2 wherein the air pump system comprises an aeration header submerged in at least a portion of the septic effluent in the pump chamber.

4. The method of claim 1 wherein the pump chamber effluent is passed to the nitrification zone by a variable speed pump system located in the pump chamber.

5. The method of claim 4 wherein the variable speed pump system is operated to provide a continuous flow of pump chamber effluent to the nitrification zone.

6. The method of claim 5 wherein the variable speed pump system is submerged in the septic effluent.

7. The method of claim 6 wherein the pump chamber comprises a high septic effluent level and a low septic effluent level.

8. The method of claim 7 wherein the variable speed pump is controlled by a pressure transducer that automatically adjusts the speed of the pump in response to variations of the septic effluent between the high septic effluent level and the low septic effluent level and thereby maintain the continuous flow of pump chamber effluent to the nitrification zone.

9. The method of claim 7 wherein the recycling effluent from the first denitrification zone to the pump chamber occurs when the septic effluent in the pump chamber is at the low septic effluent level.

10. The method of claim 1 wherein the pump chamber effluent is passed to the nitrification zone through a flow distributor system, the flow distributor system configured to provide equal flow of pump chamber effluent across the nitrification zone.

11. The method of claim 10 wherein the flow distributor system is spaced from the nitrification zone to create an air gap comprising atmospheric oxygen through which air gap the pump chamber effluent passes to increase the dissolved oxygen concentration of the pump zone effluent before it enters the nitrification zone.

12. The method of claim 11 wherein the flow distributor system comprises a flat pan comprising a plurality of equally sized and equally spaced holes.

13. The method of claim 12 wherein the flat pan comprises an upwardly extending peripheral lip defining an internal volume over the flat pan within which internal volume at least a portion of the pump chamber effluent collects before it enters the nitrification zone via the plurality of holes.

14. The method of claim 1 wherein the denitrification zone effluent from the second denitrification zone effluent comprises 10 mg/L or less of total nitrogen.

15. The method of claim 1 wherein the nitrification zone comprises sand, gravel, peat, synthetic media, or combinations thereof; and the first denitrification zone and the second denitrification zone each individually comprise a carbon-containing material.

16. The method of claim 15 wherein the carbon-containing material comprises wood chips, sawdust, biochar, lignocellulose, or combinations thereof.

17. The method of claim 15 wherein the synthetic media comprises oxygen-containing internal portions through which the pump chamber effluent passes to increase the dissolved oxygen content of the pump chamber effluent as it passes through the nitrification zone.

18. A system for nitrification and denitrification of septic effluent comprising:
- a pump chamber for contacting septic effluent with oxygen comprising an air pump system for providing at least a portion of the oxygen to be contacted with the septic effluent, and a variable speed pump system to discharge pump chamber effluent, the pump chamber effluent having a dissolved oxygen concentration, from the pump chamber;
- a nitration zone in fluid communication with the pump chamber effluent discharged by the variable speed pump system, the nitration zone comprising a nitration bed, the nitration media having a top surface and a bottom surface, from which nitration bed is discharged a first partly nitrated effluent and a second partly nitrated effluent;
- an anoxic zone in fluid communication with the first partly nitrated effluent, from which anoxic zone is discharged a partly nitrated anoxic effluent;
- a first denitrification zone in fluid communication with the first partly nitrated anoxic effluent, the first denitrification zone comprising a first denitrification bed wherein effluent from the first denitrification bed is configured to be recycled to the pump chamber; and
- a second denitrification zone in fluid communication with the second partly nitrated effluent, the second denitrification zone comprising a second denitrification bed configured for discharging a denitrification zone effluent.

19. The system of claim 18 wherein the air pump system comprises an aeration header configured to be submerged in at least a portion of the septic effluent.

20. The system of claim 18 wherein the variable speed pump system is operable to provide a constant and continuous discharge of pump chamber effluent to the nitration zone.

21. The system of claim 18 wherein the variable speed pump system is configured to be submerged in at least a portion of the septic effluent.

22. The system of claim 18 wherein the nitration zone further comprises a flow distributor disposed above the top surface of the nitration bed, the flow distributor system configured to provide equal flow of pump chamber effluent across the top surface of the nitrification bed.

23. The system of claim 22 wherein the flow distributor is spaced from the top surface of the nitration bed to create an air gap comprising atmospheric oxygen through which air gap the pump chamber effluent passes to increase the dissolved oxygen concentration of the pump chamber effluent before it enters the nitrification bed.

24. The system of claim 23 wherein the flow distributor comprises a flat pan comprising a plurality of equally sized and equally spaced holes and an upwardly extending peripheral lip defining an internal volume over the flat pan within which internal volume at least a portion of the pump chamber effluent collects before it enters the nitration bed via the plurality of holes.

25. The system of claim 18 wherein the nitrification bed comprises sand, gravel, peat, synthetic media, or combinations thereof; and the first denitrification bed and the second denitrification bed each individually comprise a carbon-containing material.

26. The method of claim 25 wherein the carbon-containing material comprises wood chips, sawdust, biochar, lignocellulose, or combinations thereof.

27. The method of claim 25 wherein the synthetic media comprises oxygen-containing internal portions through which the pump chamber effluent passes to increase the dissolved oxygen content of the pump chamber effluent as it passes through the nitrification bed.

* * * * *